United States Patent
Desbureaux et al.

(10) Patent No.: US 10,999,360 B2
(45) Date of Patent: May 4, 2021

(54) METHOD OF PROCESSING REQUESTS, AND A PROXY SERVER

(71) Applicant: ORANGE, Paris (FR)

(72) Inventors: Sylvain Desbureaux, Lannion (FR); Regis Frechin, Louannec (FR); Jean-Marc Duro, Lannion (FR)

(73) Assignee: ORANGE, Paris (FR)

(*) Notice: Subject to any disclaimer, the term of this patent is extended or adjusted under 35 U.S.C. 154(b) by 0 days.

(21) Appl. No.: 16/228,003

(22) Filed: Dec. 20, 2018

(65) Prior Publication Data
US 2019/0199822 A1 Jun. 27, 2019

(30) Foreign Application Priority Data
Dec. 21, 2017 (FR) ...................................... 1762837

(51) Int. Cl.
*H04L 29/08* (2006.01)
*H04L 29/12* (2006.01)
(Continued)

(52) U.S. Cl.
CPC ...... *H04L 67/1021* (2013.01); *H04L 61/1511* (2013.01); *H04L 61/2007* (2013.01);
(Continued)

(58) Field of Classification Search
CPC ..... H04L 63/0272; H04L 63/10; H04L 63/20; H04L 63/08; H04L 63/0281;
(Continued)

(56) References Cited

U.S. PATENT DOCUMENTS 10,075,550 B2 9/2018 Bonnet et al.
2006/0143702 A1 6/2006 Hisada et al.
(Continued)

FOREIGN PATENT DOCUMENTS

| EP | 2827549 A1 | 1/2015 |
| FR | 3031426 A1 | 7/2016 |
| WO | 2017177381 A1 | 10/2017 |

OTHER PUBLICATIONS

French Search Report dated Aug. 22, 2018 for corresponding French Application No. 1762837, filed Dec. 21, 2017.

*Primary Examiner* — Kyung H Shin
(74) *Attorney, Agent, or Firm* — David D. Brush; Westman, Champlin & Koehler, P.A.

(57) ABSTRACT

A method of processing requests, which is implemented by a proxy server of resolution of domain names of a first communications network. The first communications network is accessible by a user terminal via a communications tunnel set up over a second communications network. The processing method includes, on receiving a domain name resolution request coming from the terminal and sent via the communications tunnel: obtaining an identifier of the user from information contained in a field of the request; using the identifier of the user to determine whether the user is or is not authorized to access the domain name; if the user is authorized to access the domain name, sending an IP address to the terminal via the communications tunnel, the IP address corresponding to the domain name and being accessible to the terminal via the second communications network; else, rejecting the request from the terminal.

9 Claims, 2 Drawing Sheets

(51) Int. Cl.
*H04W 8/08* (2009.01)
*H04L 29/06* (2006.01)

(52) U.S. Cl.
CPC .............. *H04L 63/00* (2013.01); *H04L 63/10* (2013.01); *H04L 63/102* (2013.01); *H04L 67/28* (2013.01); *H04L 67/32* (2013.01); *H04W 8/082* (2013.01); *H04L 63/0272* (2013.01); *H04L 63/0281* (2013.01); *H04L 63/08* (2013.01); *H04L 63/20* (2013.01); *H04L 67/42* (2013.01)

(58) Field of Classification Search
CPC ..... H04L 67/1021; H04L 67/42; H04L 67/32; H04L 61/1511; H04L 63/00; H04L 67/28; H04L 61/2007; H04L 63/102; H04W 8/082

See application file for complete search history.

(56) References Cited

U.S. PATENT DOCUMENTS

2013/0347072 A1   12/2013  Dinha
2016/0261564 A1*  9/2016  Foxhoven ............... H04L 63/10

* cited by examiner

METHOD OF PROCESSING REQUESTS, AND A PROXY SERVER

BACKGROUND OF THE INVENTION

The invention relates to the general field of telecommunications.

The invention relates more particularly to a user terminal that has set up a communications tunnel accessing a site that is to be found in a second network that is distinct from the first.

The invention thus has a preferred, but non-limiting application when the user's terminal is in a situation of mobility and has an Internet connection via which it has set up a secure and encrypted tunnel with a private network (e.g. a business network), and the user of the terminal seeks to access a site that is to be found in the public Internet.

Two options are presently used in the state of the art for managing such a situation.

In a first option, the terminal is set to send all data streams via the secure communications tunnel that it has set up with the private network, regardless of whether or not the data streams are for entities belonging to the private network. It is then up to the private network, e.g. by means of a gateway programmed for this purpose, to redirect to the outside of the private network those data streams that are for entities (e.g. web sites) situated outside the private network. This first option enables the private network to control the data streams sent and received by the terminal and to guarantee a certain level of security, in particular by filtering the data streams, e.g. by means of a firewall. This first option nevertheless consumes bandwidth, and can degrade user experience. The user needs to share the bandwidth of the private network with the other users of that network, and the path followed by the data streams sent by the user to entities outside the private network may be roundabout and longer than if the user were accessing those entities directly.

In a second option, the terminal may be configured to send data streams for entities situated outside the private network directly to those entities, i.e. without using the communications tunnel that it has previously set up with the private network. This second option is also known as the "local breakout" option. It serves to improve the experience of the user, who benefits from the entities that the user seeks to access being accessed directly and thus faster. Nevertheless, it is not satisfactory in terms of security for the private network: specifically, the administrator of the private network no longer has any means of controlling, nor any visibility concerning, the data streams that pass from or to the terminal outside the private network, and which may for example be conveying malware.

OBJECT AND SUMMARY OF THE INVENTION

The invention serves in particular to remedy the above-mentioned drawbacks by proposing a processing method for processing requests and implemented by a proxy server of resolution of domain names of a first communications network, said first communications network being accessible by a user terminal via a communications tunnel set up over a second communications network, said processing method comprising, on receiving a domain name resolution request coming from the terminal and sent via the communications tunnel:

an obtaining step for obtaining an identifier of the user from information contained in a field of the request;

a determination step for using said identifier of the user to determine whether the user is or is not authorized to access said domain name;

if the user is authorized to access the domain name, a send step for sending an IP address to the terminal via the communications tunnel, the IP address corresponding to the domain name and being accessible to the terminal via said second communications network;

else, a rejection step of rejecting the request from the terminal.

Correspondingly, the invention also provides a proxy server of domain name resolution forming part of a first communications network accessible by a user terminal via a communications tunnel set up over a second communications network, said proxy server comprising a plurality of modules activated on receiving a domain name resolution request coming from the terminal and sent via the communications tunnel, said plurality of modules comprising:

an obtaining module configured to obtain an identifier of the user from information contained in a field of the request;

a determination module configured to use said identifier of the user to determine whether the user is or is not authorized to access said domain name;

a sender module that is activated if the user is authorized to access the domain name, and that is configured to send an IP address to the terminal via the communications tunnel, the IP address corresponding to the domain name and being accessible to the terminal via said second communications network; and a rejection module that is activated otherwise and that is configured to reject the request from the terminal.

By way of illustration, the first communications network may for example be a private business network, while the second network may be the public Internet. Nevertheless, the invention is applicable to many other contexts and to other communications networks, regardless of whether they are private or public.

By means of the domain name resolution proxy server (also referred to as a DNS proxy server) provided for in the first communications network by the invention, the administrator of the first communications network is in a position to keep control over the data streams sent by the user's terminal to entities that are situated outside the first network, while still enabling the terminal to access those entities directly. Specifically, once a tunnel has been set up between the terminal and the first network, the invention advantageously makes provision for a domain name resolution request issued by the terminal to be processed by the DNS proxy server implemented in the first network. This DNS proxy server is configured not only to perform the domain name resolution as requested by the terminal, like a conventional DNS server, but also, in accordance with the invention, it is configured to make such resolution (or at least communicating to the user's terminal the IP address, if any, resulting from such resolution) conditional on the fact that the user is authorized to access the site having the requested domain name. While the user of the terminal is away from the first network, the administrator of the first network can still filter the sites that can be accessed by the user, in compliance with the administrator's own security rules. In other words, although the user can access sites situated outside the first network directly, without making use of the communications tunnel set up with the first network, the administrator of the network can continue to apply certain security rules to that user as though the user were passing via the first network in order to access those sites.

By means of the invention, the user's experience is thus improved (and in particular the passband of the first network is not saturated in order to satisfy requests to access entities situated outside the first network, e.g. on the Internet), while still ensuring compliance with the security rules set out by the administrator of the first network in terms of controlling access. The invention thus provides a centralized solution that makes it possible to preserve the security of the first network. The invention has a preferred, but nonlimiting application when the user terminal is in a mobility situation.

It should be observed that the invention enables the administrator of the first network to define dynamically (in real time) the access control rules that are to be applied by the DNS proxy server. By way of example, these rules may consist in one or more lists of URLs (domain names), each list possibly corresponding to a different theme, and being associated with users or with groups of users who are authorized (or on the contrary who are not authorized) to access the URLs in the list or corresponding to a given theme. The invention thus provides a certain degree of granularity and a certain degree of flexibility to the administrator of the first network.

In a particular implementation, during the obtaining step, the identifier of the user is obtained by the proxy server from an IP address contained in the request and allocated to the terminal while the communications tunnel was being set up.

This implementation is particularly simple to perform. While setting up the communications tunnel between the terminal and the first network, it suffices to store the IP address allocated to the terminal on the first network in association with an identifier of the user of the terminal (e.g. the user's surname, possibly together with the user's forename), with the storage taking place for example in a database that is maintained by the DNS proxy server or that is accessible thereto. The IP address allocated to the terminal is present in the field containing the source IP address of the DNS request, and can thus easily be extracted from the DNS request by the DNS proxy server. The identifier of the user of the terminal as associated with the IP address contained in the DNS request then allows rapid and simple access to the access rights determined by the administrator of the first network for its users (where the term "access rights" is used broadly, i.e. to cover authorizations and non-authorizations to access certain domain names). This also enables the administrator of the first network to define groups of users with different access rights.

In a particular implementation, the determination step comprises interrogating at least one domain name resolution server forming part of the first network or of a third network distinct from the first network.

As mentioned above, the DNS proxy server of the invention is capable of resolving the domain name transmitted by the terminal, and for this purpose it can consult third party servers if it does not itself have the information required for performing such resolution.

In a particular implementation, if the user is authorized to access the domain name, the processing method further comprises a step of triggering configuration of the terminal by equipment of the first network to allow the terminal to transmit at least one data stream to said IP address without passing via said communications tunnel.

The equipment forming part of the first network and configuring the terminal may be a server on the first network that is distinct from the DNS proxy server.

This implementation presents a particular advantage when the terminal is initially configured to make use only of the communications tunnel set up with the first terminal in order to transmit its DNS requests and its data streams. Specifically, the configuring of the terminal provided for in this implementation serves to allow the terminal to route traffic relating to sites that are situated away from the first terminal via the second network and without passing via the tunnel if that is judged to be appropriate.

In a variant implementation, this configuration step need not be performed if the terminal is already configured in this way. Under such circumstances, it is on receiving the IP address corresponding to the domain name for which the terminal requested resolution that the terminal is in a position to judge whether it is appropriate to route the traffic for that IP address without passing via the communications tunnel, with this being done as a function of routing tables available to the terminal.

In a particular implementation, the various steps of the processing method are determined by computer program instructions.

Consequently, the invention also provides a computer program on a data medium, the program being suitable for being performed in a DNS proxy server of the first network or more generally in a computer, the program including instructions adapted to performing steps of the processing method as described above.

The program may use any programming language, and it may be in the form of source code, object code, or code intermediate between source code and object code, such as in a partially compiled form, or in any other desirable form.

The invention also provides a data medium (or a recording medium) that is readable by a computer, and that includes instructions of a computer program as specified above.

The data or recording medium may be any entity or device capable of storing the program. For example, the medium may comprise storage means such as a read only memory (ROM), for example a compact disk (CD) ROM or a microelectronic circuit ROM, or indeed magnetic recording means, e.g. a floppy disk or a hard disk.

Furthermore, the data or recording medium may be a transmissible medium such as an electrical or optical signal that can be conveyed via an electrical or optical cable, by radio, or by other means. The program of the invention may in particular be downloaded from a network of the Internet type.

Alternatively, the data or recording medium may be an integrated circuit in which the program is incorporated, the circuit being adapted to execute or to be used in the execution of the method in question.

In another aspect, the invention also provides a communications system comprising:
  a user terminal configured to set up a communications tunnel with a first communications network over a second communications network; and
  a proxy server of resolution of domain names of the first communications network in accordance with the invention;
  the terminal also being configured:
  to send to the proxy server, via the communications tunnel, all of its domain name resolution requests; and
  on receiving an IP address from the proxy server in response to a domain name resolution request, the IP address corresponding to said domain name, to be capable of transmitting at least one data stream to said IP address without passing via the communications tunnel.

In a particular embodiment, the communications system further comprises an equipment forming part of the first communications network, which equipment is activated when the user is authorized to access the domain name, and is set to configure the terminal to enable it to transmit a data stream to said IP address without passing via said communications tunnel.

In a particular embodiment, the communications tunnel set up between the terminal and the first network is secure.

By way of example, it may be a virtual private network (VPN) tunnel.

The communications system of the invention benefits from the same advantages as mentioned above for the processing method and for the DNS proxy server.

In another embodiment of the invention the communications system further comprises an equipment forming part of the first communications network, which equipment is set to configure the terminal:
- to enable it to transmit at least one data stream without passing via communications tunnel when said data stream satisfies at least one predetermined first criterion; and/or
- to enforce it to transmit at least one data stream via said communications tunnel when said data stream satisfies at least one predetermined second criterion.

This enables the administrator of the first network to have a degree of granularity for configuring the terminal and its right to access, directly or otherwise, a site situated away from the first network. The first criterion and the second criterion may thus relate to one or more specific IP addresses, or to one or more ranges of IP addresses, and also to protocols, to source and destination ports, etc. This makes it possible, e.g. on the base of the list of IP addresses, to filter sites that are accessible to the terminal directly (i.e. without passing via the communications tunnel). It is thus possible to block access to potentially dangerous applications that do not generate prior DNS requests, by forcing them to pass via the communications tunnel.

In other implementations, it is also possible to envisage that the processing method, the proxy server, and the communications system of the invention present in combination all or some of the above-mentioned characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
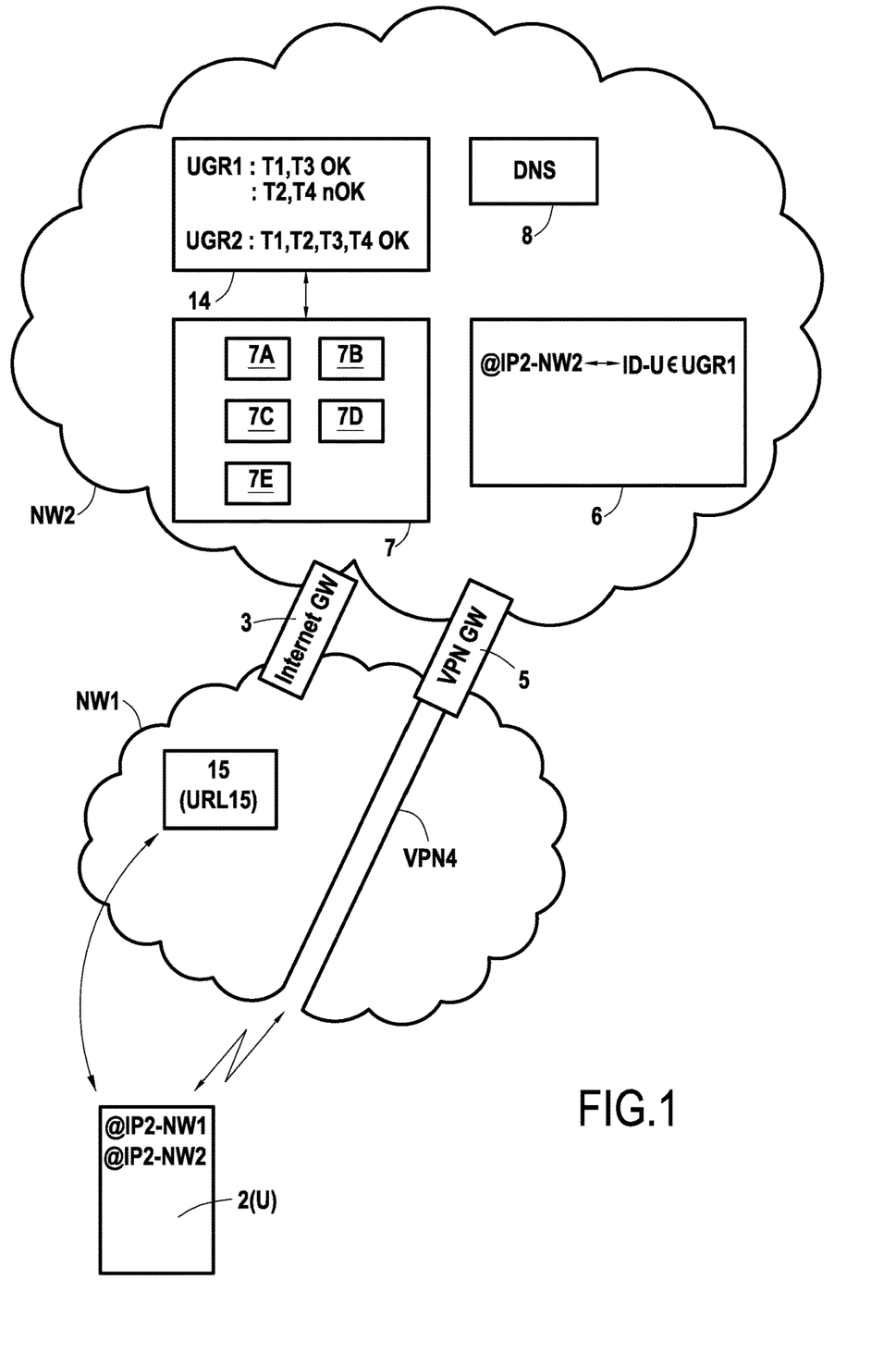
FIG. 1 is a diagram showing a communications system in accordance with the invention, in a particular embodiment.

FIG. 1 shows a communications system 1 in accordance with the invention in a particular embodiment.

In the example shown in FIG. 1, the communications system 1 comprises a terminal 2 of a user U and that has a communications interface enabling it to connect to a network NW1. By way of example, the network NW1 is the public Internet. It is assumed at this point that the terminal 2 has an IP address written @IP2-NW1 in order to communicate over the network NW1.

No limitation is associated with the nature of the terminal 2. It may be a personal computer (PC), a digital tablet, a smartphone, etc. Likewise, no limitation is associated with the nature of the communications interface used by the terminal 2 to set up connectivity with the network NW1. It may be a wired or wireless interface, it may be mobile or fixed, etc.

It is assumed that the user U is also in a position to connect via the terminal 2 with a network NW2 that is distinct from the network NW1, while using its connectivity with the network NW1. In the example shown in FIG. 1, the network NW2 is a private network, e.g. such as the network of a business with which the user U is associated. A connection to the network NW2 enables the user U to access various services made available by that network, such as for example the business's Intranet, etc. It should be observed that the private network NW2 may itself have connectivity with the network NW1, e.g. provided by means of an Internet gateway 3.

In the present example, the user U connects via the terminal 2 to the private network NW2 via a communications tunnel 4 set up over the public network NW1 between the terminal 2 and the private network NW2. In the presently-described embodiment, the communications tunnel 4 is a communications tunnel that is secure and encrypted, and is more commonly preferred to as a virtual private network (VPN). By way of example, this tunnel relies on the IPsec protocol or on the IKEv2 protocol. Setting up such a tunnel is an operation that is known to the person skilled in the art, and it is not described in greater detail herein.

While setting up the communications tunnel 4, the private network NW2 acts via a VPN gateway 5 to give the terminal 2 an IP address (written @IP2-NW2) to enable the terminal 2 to communicate over the private network NW2 with other entities of the network NW2. In a user directory 6 maintained by the network NW2, this IP address is associated in unique manner with an identifier of the user U, written ID-U. By way of example, the identifier ID-U may be made up of the surname and the forename of the user U. Nevertheless, no limitation is associated with the representation of this identifier.

The communications system 1 also has a proxy server 7 for resolving domain names (referred to as a DNS proxy server 7) in accordance with the invention and located in the private network NW2. This DNS proxy server 7 is used in particular in this example for resolving all of the domain name requests that are sent to it by terminals (and in particular by the terminal 2) via a VPN type communications tunnel set up with the network NW2 over a network that is distinct from the network NW2, such as the network NW1, for example. In other words, the DNS proxy server 7 is used to resolve all of the domain name requests coming from terminals that are not connected directly to the network NW2, but that are connected via a secure and encrypted VPN tunnel set up over a network that is distinct from the network NW2. In order to resolve the domain name requests that reach it, the DNS proxy server 7 may, in conventional manner, include a DNS database and/or may rely on a domain name server (DNS) 8 that is internal to the network NW2 and/or on one or more domain name servers (not shown in FIG. 1) belonging to networks other than the network NW2.

Furthermore, in accordance with the invention, the terminal 2 is configured to transmit all of its domain name resolution requests to the DNS proxy server 7, whenever the user U of the terminal 2 attempts to use that terminal to access web sites hosted by way of example on the network NW1 and identified by way of example by universal resource locators (URLs). In known manner, such URLs are in the form of alphanumeric strings made up of various elements, namely a first element specifying the protocol under consideration (e.g. http for hypertext transfer protocol), a second element www (for worldwide web), and a third element corresponding to a domain name that gives the location of the site. In practice, a domain name is easier for users to manipulate for users than is a numerical address of the site such as an IP address. Translating (i.e. "resolving") a domain name into its IP address is performed by domain name servers. In accordance with the invention, the domain name resolutions requested by the terminal 2 (DNS requests) are sent by that terminal to the DNS proxy server 7.

In the presently-described embodiment, at the time the VPN communications tunnel 4 is set up, the terminal 2 is configured to send all of its DNS requests to the DNS proxy server 7 via that tunnel: for this purpose, it is assumed that the VPN gateway 5 sends configuration parameters to the terminal 2, which contain the IP address of the DNS proxy server 7 (written @IP7-NW2) together with the instruction to send all of its DNS requests to the DNS proxy server 7 via VPN communications tunnel 4.

Figure 2:
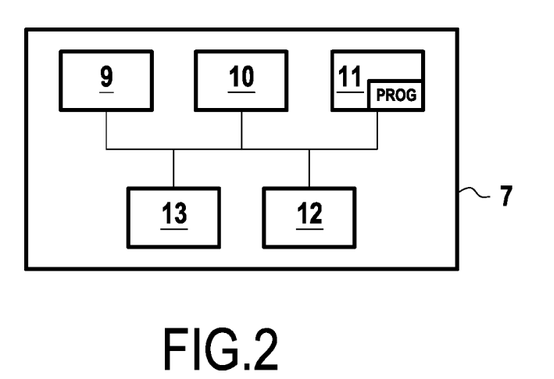
FIG. 2 shows the hardware architecture of a DNS proxy server of the FIG. 1 communications system, in accordance with the invention.

In the presently-described embodiment, the DNS proxy server 7 has the hardware architecture of a computer, as shown in FIG. 2. In particular, it comprises a processor 9, a random access memory (RAM) 10, a ROM 11, a non-volatile flash memory 12, and communications means 13 comprising one or more communications interfaces.

The communications means 13 enable the DNS proxy server 7 to communicate over the network NW2 and also over other networks, such as for example the network NW1.

The ROM 11 of the DNS proxy server 7 constitutes a data medium in accordance with the invention that is readable by the processor 9 and that stores a computer program PROG in accordance with the invention.

The computer program PROG defines functional modules (software modules in this example) of the DNS proxy server 7 that are configured to perform the steps of the processing method of the invention. The functional modules defined by the program PROG rely on and/or control the above-mentioned hardware elements 9-13 of the DNS proxy server 7. They are activated on receiving a DNS request from a terminal (such as the terminal 2) via the communications tunnel set up with the network NW2 and located on the network NW1 (such as the VPN tunnel 4) and in this example comprising in particular, and as shown in FIG. 1:

an obtaining module 7A configured to obtain an identifier of the user originating the DNS request, on the basis of information contained in a field of the request. In the presently-described implementation, the information used by the obtaining module 7A for finding the identifier of the user is the source IP address of the request, which corresponds to the IP address that was allocated to the terminal by the VPN gateway 5 when setting up the communications tunnel between the terminal and the network NW2;

a determination module 7B configured to use the user identifier to determine whether the user is or is not authorized to access the domain name identified in the DNS request. In the presently-described implementation, the rights of the user to access the domain name identified in the DNS request are determined by the determination module 7B interrogating a database 14 that contains a set of access rules set up by the administrator of the network NW2 and described in greater detail below;

a domain name resolution module 7C;

a send module 7D that is activated if the user is authorized to access the domain name and that is configured to use the communications tunnel to send an IP address to the terminal that corresponds to the domain name that can be accessed by the terminal, in particular via the network NW1; and a rejection module 7E that is activated otherwise, and that is configured to reject the DNS request from the terminal.

As mentioned above, the DNS proxy server 7 is configured in accordance with the invention to verify whether the terminal (specifically the terminal 2) that is sending it a DNS request is authorized in compliance with the access rules set by the administrator of the network NW2 to access to the domain name constituting the subject matter of the DNS request. In this example, these rules are stored in the database 14 and they associate a user or a group of users with the domain names or URLs that those users do or do not have the right to access. Each group of users may for example be defined by a group identifier UGR1, UGR2, etc. and may correspond to a category of users (e.g. "network administrator", "assistants", "technicians", "human resources", etc.). In addition, the URLs or the domain names may be classified as a function of particular themes to which they belong (e.g.: theme T1="audio/video", theme T2="games", theme T3="social networks", theme T4="malware", etc.).

This makes it possible to define access rights for each user or for each group of users as a function of such themes. By way of illustration, in the database 14 shown in FIG. 1, the stored access rules specify, for each user or group of users under consideration (UGR1 and UGR2 in this example), the URL themes (T1, T2, T3, or T4) or the domain names to which access is authorized (specified by "ok" in the figure) for that particular user or group of users: the user or group of users is then authorized to access all URLs or domain names that correspond to the theme and that are included in the associated list of URLs or of domain names. In similar manner, the access rules stored in the database 14 specify, for each user or group of users under consideration, the URL themes or domain names to which access is not authorized (marked "nok" in the figure) for that user or group of users: the user or group of users then does not have the right to access any of the URLs or domain names corresponding to the theme and included in the associated list of URLs or domain names.

In the example shown in FIG. 1, users belonging to the user group UGR1 have the right to access the URLs and domain names corresponding to the theme T1 and to the theme T3, but they are not authorized access to the URLs or to the domain names corresponding to the themes T2 and T4. The users of the group UGR2 have the right to access the URLs or domain names corresponding to all of the themes T1 to T4.

Naturally, these examples are given purely by way of illustration and other access rules with different presentations could be considered in the context of the invention.

It should be observed that the access rules stored in the database 14 may vary over time and can easily be updated in real time and in dynamic manner by the administrator of the network NW2.

There follows a description of how these access rules are used by the DNS proxy server 7 in the ambit of the invention.

Figure 3:
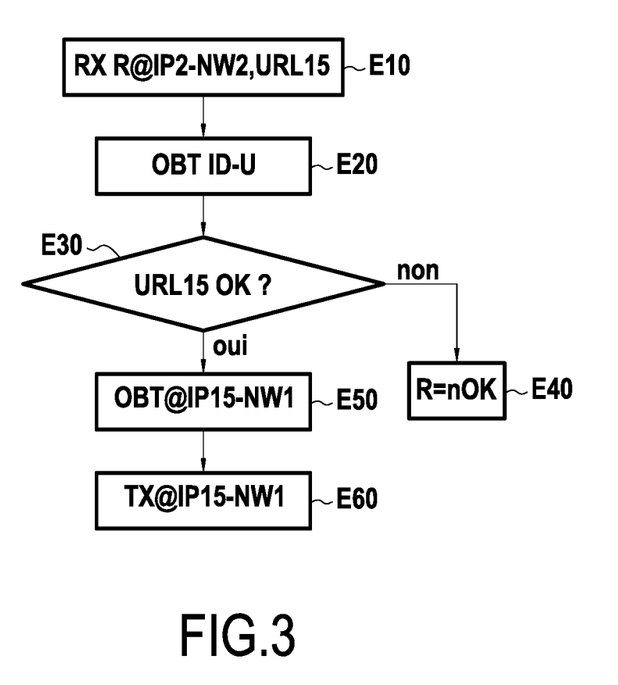
FIG. 3 is a flow chart showing the main steps of the processing method of the invention as performed by the FIG. 2 DNS proxy server in a particular implementation.

FIG. 3 shows the main steps of the processing method of the invention as performed by the DNS proxy server 7 for processing the DNS requests that reach it from the terminal 2, in a particular implementation.

It is assumed at this point that the user U of the terminal 2 seeks to access a web site 15 situated in the network NW1 and identified by a URL written URL15.

In accordance with this configuration, the terminal 2 sends for this purpose a DNS request to resolve the domain name contained in the URL URL15 to the DNS proxy server 7 via the VPN communication tunnel 4. This DNS request is written R and it includes as its destination IP address the IP address of the DNS proxy server 7 communicated while setting up the tunnel, and as its source IP address, the IP address @IP2-NW2 allocated to the terminal 2 while setting up the tunnel, and as its URL the URL15 that contains the domain name to be resolved.

On the DNS proxy server 7 receiving the request R (step E10), the server extracts the source IP address @IP2-NW2 from the request R. Thereafter, using its obtaining module 7A, it uses the IP address @IP2-NW2 to interrogate the user directory 6 in order to obtain the identifier ID-U of the user of the terminal 2 (step E20). Also by means of the identifier ID-U, it can determine to which user group(s) the user U belongs, if any. This information may be stored in the user directory 6 of the network NW2, in association with the identifier ID-U of the user U, or in another database maintained by the network NW2. By way of example, it is assumed that the user U belongs to the user group UGR1.

Thereafter, using its determination module 7B, the DNS proxy server 7 determines whether the user U as identified by ID-U is or is not authorized to access the URL URL15 that is included in the request R, or in equivalent manner to access the domain name contained in the URL (test step E30). For this purpose, in this example, the determination module 7B interrogates the database 14 using both the identifier of the group UGR1 to which the user U belongs and also the URL URL15. It should be observed that if the access rules stored in the database 14 define rights on a per-user basis, then the determination module 7B can interrogate the database directly with the identifier ID-U of the user U.

It is assumed at this point that the URL URL15 belongs to the theme T1 and is contained in the list stored in the database 14 corresponding to this theme. In accordance with the access rules stored in the database 14, the users of the group UGR1 are authorized to access the URLs or the domain names corresponding to the theme T1 (cf. the example shown in FIG. 1). The determination module 7B thus determines that the user U is authorized to access the URL URL15 and the associated domain name (response "yes" to test step E30).

It informs the domain name resolution module 7C.

In contrast, if the determination module 7B determines that the user U is not authorized to access the URL URL15 or the associated domain name in application of the access rules defined in the database 14 (response "no" to test step E30), it informs the rejection module 7E, which rejects the DNS request from the terminal 2 (step E40). In the presently-described implementation, this rejection is manifested by the domain name contained in the URL URL15 not being resolved and by a request-rejected message being sent to the terminal 2 via the VPN communications tunnel 4. By way of example, this message may be displayed on the screen of the terminal 2 of the user U and may inform the user U that access to the URL URL15 is not authorized for that user.

If the user U is authorized to access the domain name corresponding to the URL URL15, then the resolution module 7C proceeds with resolving the domain name in conventional manner (step E50). For this purpose, it may consult a DNS database that is specific thereto and that associates various domain names with the corresponding IP addresses, it may interrogate one or more DNS serves of the network NW2 (such as the DNS server 8) or belonging to remote networks (a third network in the meaning of the invention, which third network could be the network NW1), or it could delegate resolution of the domain name to those servers, etc.

It thus obtains the IP address corresponding to the domain name of the URL URL15, written in this example @IP15-NW1.

Thereafter, acting via its send module 8D, the DNS proxy server 7 sends the IP address @IP15-NW1 that it has obtained to the terminal 2 via the VPN communications tunnel 4 in response to the DNS request R that was sent to it by the terminal 2 (step E60).

On receiving the IP address @IP15-NW1, the terminal 2 is in a position, providing it is appropriately configured for this purpose (i.e. in order to perform a "local breakout" mechanism), to transmit its data streams to this address directly via its own communications interface with the network NW1 and without passing via the VPN communications tunnel 4 (in other words, the data streams sent to the site 15 by the terminal 2 do not pass via the VPN communications tunnel 4).

In a particular implementation, the sending of the resolved IP address @IP15-NW1 to the terminal 2 by the DNS proxy server 7 may be accompanied by triggering an operation of configuring the terminal 2 to enable it to transmit at least one data stream to said IP address without passing via said communications tunnel. This may be performed remotely by the DNS proxy server 7 or by some other equipment in the network NW2 (e.g. by another server that is not shown in FIG. 1). Such dynamic and proactive configuration of the terminal 2 makes it possible to ensure that regardless of its initial configuration (whether it is in "local breakout" mode or in a mode for communication solely by the VNP tunnel), it is indeed in a position to communicate directly with the site 15 without passing via the VPN communications tunnel 4 whenever its routing table informs it that this is more advantageous, for example. Such remote dynamic configuration can be performed simply using the IPsec and IKEv2 protocols that are commonly used in VPN communications tunnels.

It should be observed that such dynamic configuration may be for the purpose of being applied by the terminal 2 in general manner whenever it processes data streams that it seeks to send to the network NW1, or it may also be accompanied by the equipment of the network NW2 that is involved with specified ranges of IP addresses, protocols, and/or ports (source or destination) to which it applies (first criterion in the meaning of the invention) and/or to which it does not apply (second criterion in the meaning of the invention).

The invention has a preferred application when the terminal 2 is in a situation of mobility. Typically, it enables the administrator of the network NW2 to act via the DNS proxy server 7 to filter the sites that the terminal 2 can access directly over the network NW1 as though the terminal 2 were connected directly to the network NW2 (i.e. without passing via a VPN communications tunnel). This avoids saturating the passband of the network NW2, and the experience of the user U is greatly improved. This also makes it possible for the administrator of the network NW2 to decide which data streams ought to transit via the administrator's network (via the VPN communications tunnel 4), and which data streams can be routed without passing via the network.

The invention claimed is:

1. A processing method comprising:
processing requests, which is implemented by a proxy server of resolution of domain names of a first communications network, said first communications network being accessible by a user terminal via a communications tunnel set up over a second communications network, said proxy server being comprised in said first communications network, and said processing by the proxy server comprising, on receiving a domain name resolution request coming from the terminal and sent via the communications tunnel:
an obtaining act of obtaining an identifier of the user from information contained in a field of the request, wherein the identifier of the user is obtained by the proxy server from an IP address of the user terminal contained in the request and was allocated to the user terminal while the communications tunnel was being set up;
a determination act of using said identifier of the user to determine whether the user is or is not authorized to access said domain name;
if the user is authorized to access the domain name, a send act of sending an IP address to the terminal via the communications tunnel, the IP address corresponding to the domain name and being accessible to the terminal via said second communications network;
else, a rejection act of rejecting the request from the terminal.

2. The processing method according to claim 1, wherein the determination act comprises interrogating at least one domain name resolution server forming part of the first network or of a third network distinct from the first network.

3. The processing method according to claim 1, wherein, if the user is authorized to access the domain name, the method further comprises an act of causing the terminal to be configured by an equipment of the first network so as to allow the terminal to transmit at least one data stream to said IP address of the domain name without passing via said communications tunnel.

4. A non-transitory computer-readable data medium storing a computer program having instructions, which when executed by a processor of a proxy server configure the proxy server to perform a method of processing requests, the proxy server being a server of resolution of domain names of a first communications network and comprised in said first communications network, said first communications network being accessible by a user terminal via a communications tunnel set up over a second communications network, said processing comprising, on receiving a domain name resolution request coming from the terminal and sent via the communications tunnel:
an obtaining act of obtaining an identifier of the user from information contained in a field of the request, wherein the identifier of the user is obtained by the proxy server from an IP address of the user terminal contained in the request and was allocated to the user terminal while the communications tunnel was being set up;
a determination act of using said identifier of the user to determine whether the user is or is not authorized to access said domain name;
if the user is authorized to access the domain name, a send act of sending an IP address to the terminal via the communications tunnel, the IP address corresponding to the domain name and being accessible to the terminal via said second communications network;
else, a rejection act of rejecting the request from the terminal.

5. A proxy server of domain name resolution forming part of a first communications network accessible by a user terminal via a communications tunnel set up over a second communications network, said proxy server comprising:
a processor; and
a non-transitory computer-readable medium comprising instructions stored thereon which when executed by the processor configure the proxy server to perform the following acts on receiving a domain name resolution request coming from the terminal and sent via the communications tunnel:
obtaining an identifier of the user from information contained in a field of the request, wherein the identifier of the user is obtained by the proxy server from an IP address of the user terminal contained in the request and was allocated to the user terminal while the communications tunnel was being set up;
using said identifier of the user to determine whether the user is or is not authorized to access said domain name;
if the user is authorized to access the domain name, sending an IP address to the terminal via the communications tunnel, the IP address corresponding to the domain name and being accessible to the terminal via said second communications network; and
else rejecting the request from the terminal.

6. A communications system comprising:
a user terminal configured to set up a communications tunnel with a first communications network over a second communications network; and
a proxy server of resolution of domain names of the first communications network accessible by the user terminal via the communications tunnel set up over the second communications network, said proxy server being comprised in the first communications network and comprising:
a processor; and
a non-transitory computer-readable medium comprising instructions stored thereon which when executed by the processor configure the proxy server to perform the following acts on receiving a domain name resolution request coming from the terminal and sent via the communications tunnel:
obtaining an identifier of the user from information contained in a field of the request, wherein the identifier of the user is obtained by the proxy server from an IP address of the user terminal contained in the request and was allocated to the user terminal while the communications tunnel was being set up;
using said identifier of the user to determine whether the user is or is not authorized to access said domain name;
if the user is authorized to access the domain name, sending an IP address to the terminal via the communications tunnel, the IP address corresponding to the domain name and being accessible to the terminal via said second communications network; and
else rejecting the request from the terminal;
said terminal also being configured:
to send to the proxy server, via the communications tunnel, all of its domain name resolution requests; and
on receiving the IP address of the domain name from the proxy server in response to the domain name resolution request, to transmit at least one data stream to said IP address of the domain name without passing via said communications tunnel.

7. The communications system according to claim 6 further comprising an equipment forming part of the first communications network, which equipment is activated when the user is authorized to access the domain name, and is set to configure the terminal to enable the terminal to transmit a data stream to said IP address of the domain name without passing via said communications tunnel.

8. The communications system according to claim 6 further comprising an equipment forming part of the first communications network, which equipment is set to configure the terminal:
to enable the terminal to transmit at least one data stream without passing via communications tunnel when said data stream satisfies at least one predetermined first criterion;
and/or to enforce the terminal to transmit at least one data stream via said communications tunnel when said data stream satisfies at least one predetermined second criterion.

9. The communications system according to claim 6, wherein the communications tunnel is secure.

\* \* \* \* \*